United States Patent [19]

Sproul

[11] 4,309,174
[45] Jan. 5, 1982

[54] BELT TENSIONER CONSTRUCTION

[75] Inventor: Nolte V. Sproul, Canton, Ohio
[73] Assignee: Dyneer Corporation, Canton, Ohio
[21] Appl. No.: 119,999
[22] Filed: Feb. 8, 1980
[51] Int. Cl.³ .............................................. F16H 7/12
[52] U.S. Cl. .................................... 474/135; 474/117
[58] Field of Search .............. 474/115, 117, 135, 138; 267/62

[56] References Cited

U.S. PATENT DOCUMENTS

| 337,048 | 3/1886 | Davis | 267/62 X |
| 1,163,891 | 12/1915 | Caverno | 474/135 |
| 2,395,332 | 2/1946 | Laymon | 474/135 |
| 2,743,679 | 5/1956 | Lofton | 474/135 X |

FOREIGN PATENT DOCUMENTS

| 100333 | 3/1937 | Australia | 474/135 |
| 104513 | 8/1917 | United Kingdom | 267/62 |

*Primary Examiner*—Lawrence J. Staab
*Attorney, Agent, or Firm*—Frease & Bishop

[57] ABSTRACT

A belt tensioning device for an endless drive belt for a vehicle accessories drive system. A bracket, which terminates in a pair of outwardly extending end flanges, is adapted to be mounted on a vehicle engine adjacent the drive belt. A cylindrical cup-shaped housing is mounted on each of the bracket flanges and contains a pair of volute springs. A plunger is operatively engaged by each of the volute spring pairs and is biased outwardly from an open end of the housing toward the oppositely mounted spring housing. The axes of the plungers are parallel to each other and spaced apart. A lever is pivotally mounted on the bracket intermediate the spring housings and extends from the bracket perpendicularly with respect to the axes of the plungers. The plungers are connected to the lever, one on each side of the lever pivot point. An idler pulley is rotatably mounted on the extended end of the lever and is moved in a belt tensioning direction for engagement with the drive belt by the biasing actions of the volute springs. The volute springs provide and maintain a generally constant tensioning force on the drive belt, and also provide a damping effect due to the unequal load rate deflection of each spring coil and due to the sliding friction between the individual spring coils.

10 Claims, 7 Drawing Figures

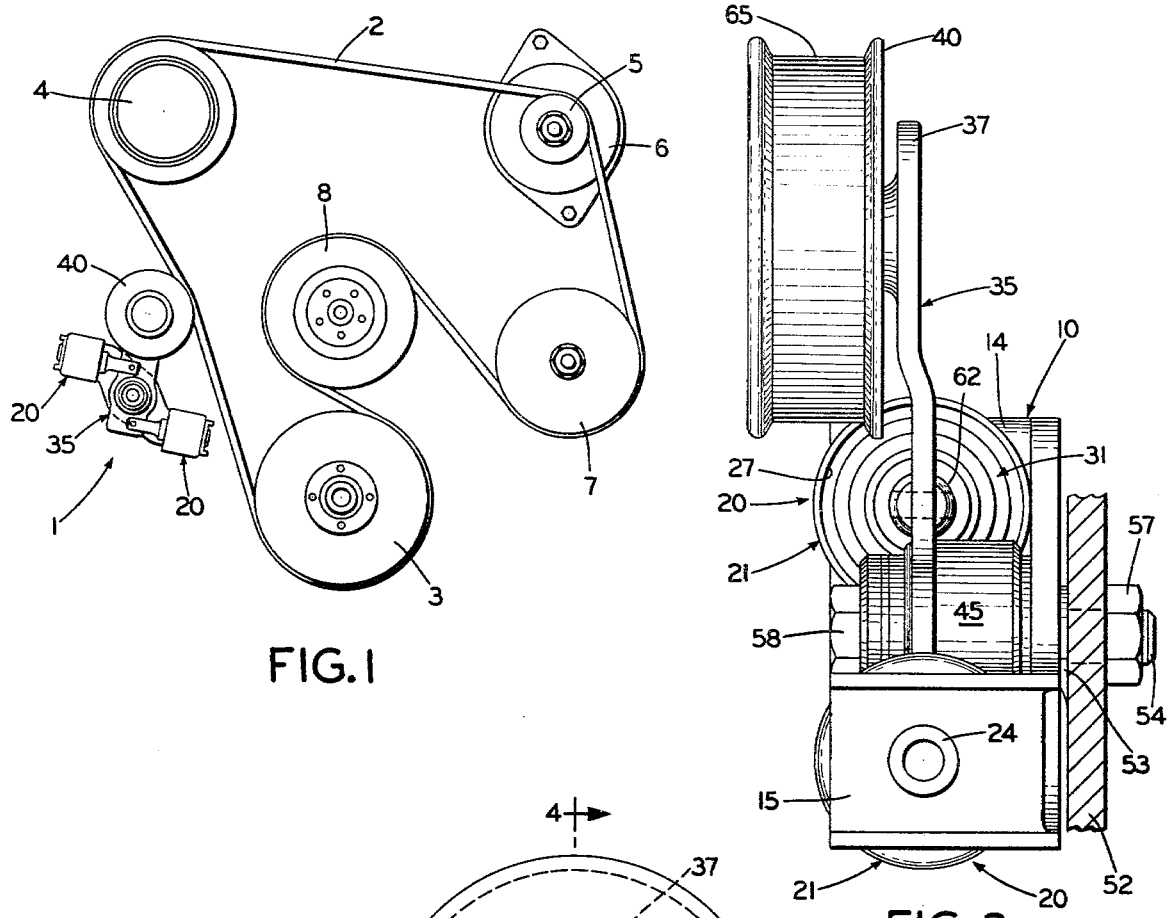
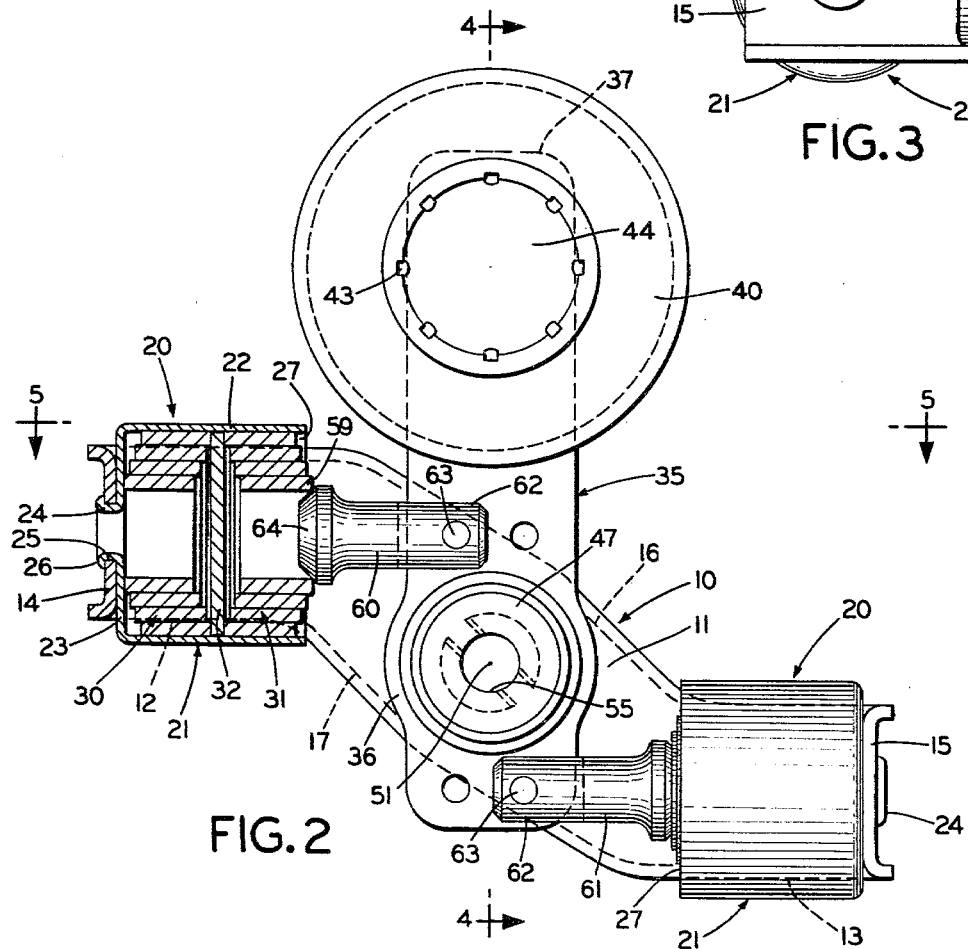

BELT TENSIONER CONSTRUCTION

BACKGROUND OF THE INVENTION

1. Field of the Invention

The invention relates to belt tensioning devices and arrangements, and in particular to a spring actuated belt tensioner for use with an endless belt of a vehicle accessories drive system. More particularly, the invention relates to an improved, inexpensive belt tensioner construction using one or more volute springs for applying the tensioning force and for achieving a damping effect.

2. Description of the Prior Art

There is the trend today in the automobile industry to operate the various vehicle accessories, such as the power steering pump, oil and air pumps, air conditioning and alternator, by a single endless belt driven by a pulley connected to the engine crankshaft. This system is referred to as a "serpentine" drive belt system. To ensure optimum operating efficiency for these various accessories, it is necessary that the drive belt be maintained at a predetermined tension to assure efficient performance of the accessories as well as satisfactory service life for the belt. Due to the relatively greater length for the single drive belt which replaces the heretofore plurality of smaller belts, there is a greater tendency for the belt to stretch, which will affect the operating characteristics of the driven accessories. Therefore, it is desirable that a belt tensioning device be used for these endless belts to provide reliable service over an extended period of time and to maintain a constant amount of tension thereon regardless of the amount of belt stretch.

Numerous devices have been proposed and used to accomplish this purpose. One type of tensioner uses a bushing formed of an elastomeric material which is placed in compression by some mechanical means for continuously exerting a tensioning force on the belt. Examples of these constructions are shown in U.S. Pat. Nos. 3,975,965 and 4,144,772. These tensioner constructions, which use an elastomeric material, have the disadvantages in that the high load rate which they exert on the belt results in the rapid loss of tensioning as the belt stretches, and this load rate limits the stroke of the belt-engaged idler pulley to a shorter distance than desired. Also, sudden acceleration and deceleration of the drive belt can cause a whipping action to occur which creates a time lag before full damping is achieved.

Numerous other types of belt tensioning devices use coil springs which are either in compression or tension, for applying and maintaining the tensioning force on a belt-engaging idler pulley or chain-engaging sprocket. Some examples of these types of constructions are shown in U.S. Pat. Nos. 2,703,019, 3,413,866, 3,483,763, 3,631,734, 3,768,324, 3,812,733, 3,924,483, 3,965,768 and 4,108,013. Some coil spring actuated devices use the biasing force of a spring in combination with hydraulic actuated members for regulating the amount of tensioning force applied to the belt and for achieving a damping effect. Examples of these combination spring and hydraulic-actuated belt tensioners are shown in U.S. Pat. Nos. 2,051,488, 3,142,193 and 4,077,272.

It is desirable that a belt tensioner be provided with some type of damping means to prevent excessive oscillation from occurring in the spring tensioning member, and which will absorb sudden shock to prevent a whipping action from occurring in the tensioner and drive belt, such as upon sudden acceleration and deceleration of the vehicle. This damping action is especially critical when a coil spring is used for applying the belt tensioning force since coil springs are highly susceptible to develop natural oscillating frequencies when the counter force, which is exerted thereon by the belt, fluctuates during acceleration and deceleration of the vehicle. Such oscillating action affects the efficiency of the tensioning force applied to the belt by the coil spring and reduces belt life. Various damping device have been used with belt tensioners to eliminate or reduce this problem of coil spring oscillation. Several types of constructions use hydraulic fluid as the damping means, such as shown in U.S. Pat. Nos. 2,893,255, 3,964,311 and 3,986,407.

It is highly desirable when developing a belt tensioner intended primarily for use on an automobile to devise a construction which can be produced as inexpensively as possible, without sacrificing durability and efficiency. Also, it is desirable that the belt tensioner be as small and lightweight as possible for the energy saving effect and due to the limited space on an engine for mounting the same in the desired operating position.

Although many of the above-listed belt tensioners and other tensioners known in the art are believed to perform satisfactorily, I am not aware of any belt tensioner which uses one or more volute springs for applying the belt tensioning force, which springs also provide a damping effect due to the characteristics of volute springs, and in which such springs are arranged in a simple, inexpensive, rugged and compact construction.

SUMMARY OF THE INVENTION

Objectives of the invention include providing an improved device for tensioning the drive belt for vehicle accessories, which device maintains a generally constant, predetermined tensioning force on the belt throughout the life of the belt regardless of whether the engine is on or off, or operating at various speeds and conditions; providing such an improved belt tensioner which is of a relatively inexpensive design, many of the components of which are formed of sheet metal components which can be mass-produced by simple metal stamping procedures and then assembled with a usual idler pulley to form a complete unit which can be mounted on an engine by a simple mounting bracket at various locations adjacent the accessories drive belt; providing such an improved belt tensioner in which one or more volute springs provide the tensioning force by biasing a pivotally mounted lever in a belt tensioning direction, in which the volute springs also provide a damping effect due to the unequal load rate deflection of each coil of a volute spring and due to the friction created between the contacting coils of said springs; providing such an improved belt tensioner in which a pair of volute spring assemblies, each consisting of one or more volute springs, operatively engage the pivotally mounted lever at diametrically opposite locations with respect to the lever pivot point to provide a sufficiently large tensioning force without using an excessively large and expensive single volute spring; and providing such an improved belt tensioner construction which achieves the stated objectives in a simple, effective, rugged, compact, lightweight and relatively inexpensive manner, and which solves problems and satisfies needs existing in the art.

These objectives and advantages are obtained by the improved belt tensioner construction for tensioning an endless drive belt for vehicle engine accessories, the general nature of which may be stated as including bracket means adapted to be mounted on a vehicle engine adjacent the drive belt; lever means pivotally mounted on the bracket means and movable in a belt tensioning direction; spring means mounted on the bracket means and operatively engageable with the lever means biasing the lever means in a belt tensioning direction, said spring means being at least a single volute spring; and rotatable pulley means mounted on the lever means and movable toward tensioning engagement with the drive belt upon pivotal movement of the lever means by the spring means.

BRIEF DESCRIPTION OF THE DRAWINGS

A preferred embodiment of the invention—illustrative of the best mode in which applicant has contemplated applying the principles—is set forth in the following description and shown in the accompanying drawings, and is particularly and distinctly pointed out and set forth in the appended claims.

FIG. 1 is a diagrammatic view looking toward the front of an engine, illustrating an endless drive belt drivingly engaged with the vehicle accessories and with the improved belt tensioner construction engaged with the drive belt.

FIG. 2 is an enlarged front elevational view of the belt tensioner of FIG. 1, with one of the volute spring assemblies shown in section;

FIG. 3 is a right-hand end view of the belt tensioner shown in FIG. 1 with a portion of an engine mounting bracket shown in section;

Similar numerals refer to similar parts throughout the drawings.

DESCRIPTION OF THE PREFERRED EMBODIMENT

Figure 4:
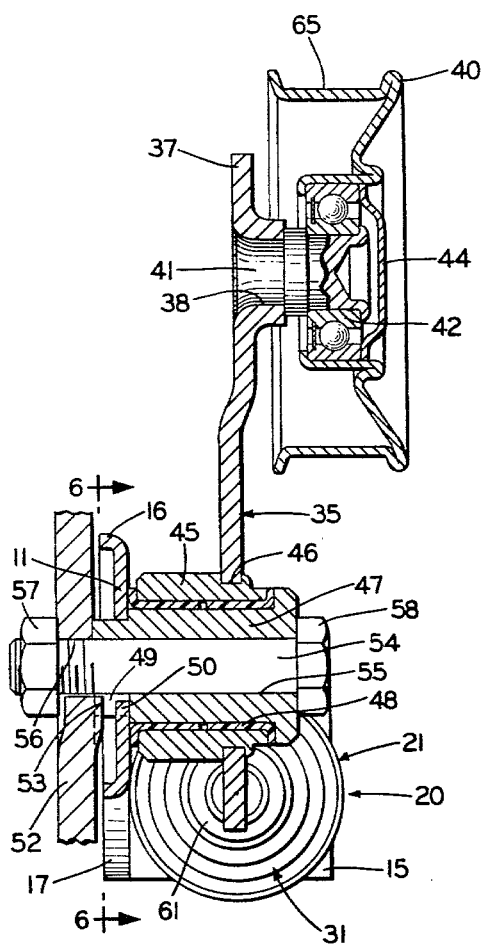
FIG. 4 is a sectional view taken on line 4—4, FIG. 2.

Referring to FIG. 1, of the drawings, the improved belt tensioner construction is indicated generally at 1, and is shown in tensioning engagement with an endless drive belt 2 of a power transmission belt drive system which is shown diagrammatically looking toward the front of an engine. The accessory drive system consists of a plurality of belt pulleys or sheaves having configurations and diameters determined by and associated with engine accessory components and their locations relative to each other. The various pulleys are supported on their respective engine components, which in turn are mounted on an engine (not shown) in a usual manner known in the art. Belt 2 preferably operates in a single, vertical plane to eliminate binding and skewing of the belt.

The particular engine accessories drive system shown in FIG. 1 consists of a main driving pulley 3 which is operatively connected to the main drive shaft of the engine, a pulley 4 which is operatively connected to the engine air pump, a pulley 5 which is operatively connected to an alternator 6 which provides electrical power for the engine, a pulley 7 which is operatively connected to the vehicle power steering unit, and a pulley 8 which is operatively connected to the engine water pump.

Figure 5:
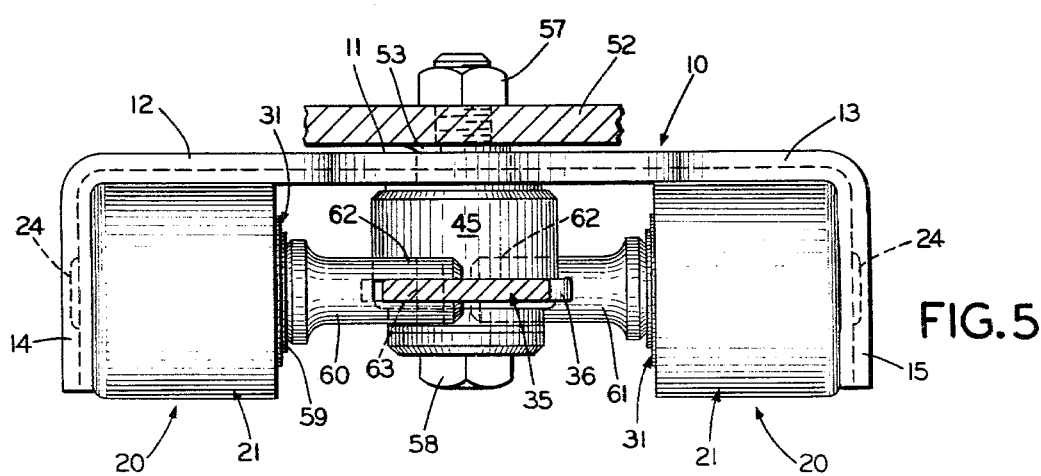
FIG. 5 is a sectional view taken on line 5—5, FIG. 2.

Improved belt tensioner 1 includes a spring mounting bracket, indicated generally at 10, which is formed of stamped, sheet metal material. Bracket 10 has a flattened, Z-shaped configuration (FIG. 2) having a straight, diagonally extending, central portion 11 which terminates in a pair of end portions 12 and 13. End portions 12 and 13 have outwardly extending flanges 14 and 15, respectively, which are formed integrally with the end portions and are perpendicular with respect thereto (FIG. 5). Bracket 10 has rolled edges 16 and 17 which stiffen and strengthen the bracket. Flanges 14 and 15 extend perpendicularly outwardly in the same direction with respect to bracket portions 11, 12 and 13, and are parallel with respect to each other.

A spring assembly, indicated generally at 20, is mounted on each flange 14 and 15. Each spring assembly 20 is similar to each other, and therefore, only one is described in detail below and shown in section in the drawings. Each spring assembly 20 includes a cup-shaped, sheet metal housing, indicated generally at 21, formed by a cylindrical side wall 22 and an integrally connected end wall 23. End wall 23 is formed with a centrally located circular boss 24 which extends through a complementary-shaped hole 25 formed in flanges 14 and 15 for mounting housings 21 thereon by rolled boss edges 26. The open ends 27 of spring housings 21 face toward each other when mounted on bracket flanges 14 and 15.

In accordance with the invention, a pair of volute springs 30 and 31 (FIGS. 2 and 7) are mounted in each housing 21, and preferably are separated by a slidably mounted spacer disc 32. Disc 32 is slidable axially within spring housing 21 and may be eliminated if the individual outermost coils of spring 30 and 31 are abutted uniformly against each other. Volute springs 30 and 31 are mounted within housing 21, whereby the force exerted thereby is axially outward of housing 21 through open end 27.

Figure 6:
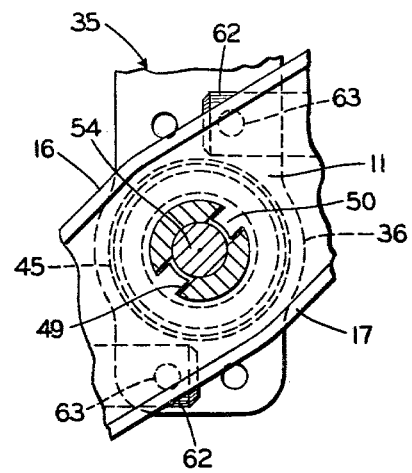
FIG. 6 is a fragmentary sectional view taken on line 6—6, FIG. 4.

A lever, indicated generally at 35, is pivotally mounted at the midpoint of central portion 11 of spring mounting bracket 10 by a pivotal mounting arrangement shown particularly in FIGS. 4 and 6. Lever 35 preferably is a flat, stamped, sheet metal strip of material having a circular boss 36 formed in the extended end 37 thereof, which boss defines a circular opening 38. An idler pulley 40 is rotatably mounted on extended end 37 of lever 35 by a stub shaft 41 and bearing 42. Stub shaft 41 is pressfitted within boss opening 38 and pulley 40 is rotatably mounted thereon by a roller bearing ring 42. A bearing seal 44 is secured within the pulley hub by peened metal areas 43 (FIG. 2).

Lever 35 is pivotally mounted on bracket 10 by a cylindrical hub 45, which is telescopically mounted within a circular opening 46 formed in the lower portion of lever 35. Hub 45 is telescopically rotatably mounted on a cylindrical shaft 47 with an intervening nylon or similar low-friction bearing sleeve 48 providing a smooth sliding surface therebetween. One end of shaft 47 is formed with axially extending keyways 49 for receiving keys 50 formed on central portion 11 of bracket 10 to firmly attach bracket 10 to shaft 47.

Belt tensioner 1 is adapted to be mounted on an engine mounting bracket 52 by a bolt 54, which extends through a central bore 55 of shaft 47 and through a correspondingly aligned hole 56 in engine mounting bracket 52. A nut 57 firmly clamps belt tensioner 1 on engine bracket 52 with bolt head 58 being clamped tightly against the outer end of shaft 47 (FIG. 4). An offset metal portion 53, formed on engine bracket 52 (FIG. 4), forms a key which extends into one of the keyways 49 of shaft 47 to prevent rotation of shaft 47 and bracket 10 on engine mounting bracket 52.

A pair of plungers 60 and 61 are operatively engaged with the endmost coil 59 of each volute spring 31 (FIG. 2) to transmit the biasing force of spring pairs 30–31 to lever 35. Each plunger is formed with slotted outer end 62 into which an edge portion of lever 35 extends with a pivot pin 63, pivotally attaching plunger end 62 to lever 35. Inner ends 64 of plunger 60 are tapered and are slidably engaged by the innermost coil 59 of volute springs 31. The axes of plungers 60 and 61 are parallel to each other (FIG. 2) and spaced apart with the pivot point or pivot axis 51 of lever 35 being located intermediate thereof. Preferably, pivot pins 63 of plungers 60 and 61 lie on an imaginary line which extends through the center of the lever pivot point 51.

Figure 7:
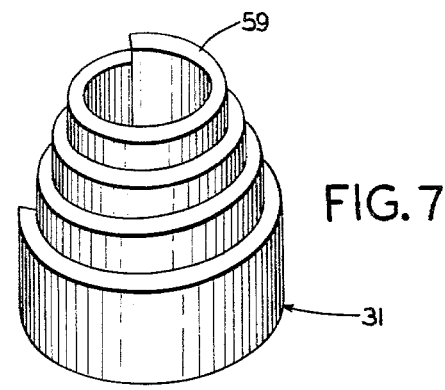
FIG. 7 is an enlarged perspective view of one of the volute springs of the improved belt tensioner.

Each volute spring 30 and 31 is of a usual construction, as shown in FIG. 7, which is a coil spring, conical in shape, with the coils extending in an axial direction and having cylindrical-shaped inner and outer surfaces and rectangular, cross-sectional configurations. Each coil has a different radius and is in sliding contact with the adjacent coils. This frictional sliding contact and different coil configuration provides the desired damping effect achieved by improved belt tensioner 1. When mounted in housings 21, spring pairs 30–31 are compressed in an axial direction, and as can be seen in FIG. 2, will attempt to expand outwardly, forcing plungers 60 and 61 toward lever 35. Plungers 60 and 61 will rotate lever 35 in a clockwise direction about lever pivot point 51 moving idler pulley 40 in a clockwise belt tensioning direction, whereby the desired tensioning force is exerted on belt 2, which is seated within peripheral groove 65 of pulley 40.

The operation of improved belt tensioner construction 1 is shown generally in FIG. 1 and described briefly below. Tensioner 1 is mounted on engine mounting bracket 52, as described above, which in turn is mounted on the engine block closely adjacent belt 2. Lever 35 is moved manually in a counterclockwise direction axially compressing volute spring pairs 30–31 within housings 21. Belt 2 then is placed within pulley groove 65 of pulley 40. After release of the manual restraining force on lever 35, spring pairs 30–31 bias lever 35 and pulley 40 in a clockwise, belt tensioning direction to apply a predetermined tensioning force on belt 2. The desired amount of tensioning force is predetermined and can be obtained by the proper selection of springs 30 and 31 in combination with the radial distance of plunger pivot pins 63 from lever pivot point 51, which distance determines the force moment applied to lever 35 by spring pairs 30–31 through plungers 60 and 61.

The sliding friction occurring between the cylindrical surfaces of the adjacent coils of the volute spring provides a damping effect when pulley 40 is subjected to a force tending to move it in a counterclockwise direction, such as may occur during the sudden acceleration or deceleration of the vehicle. Furthermore, due to the different diameters of the spring coils, the coils will have unequal load rate deflections which will upset and prevent a natural oscillating frequency from developing in the spring, as occurs in usual helical coil springs. This characteristic also enhances the damping effect provided by the volute spring pairs.

If desired, spring pairs 30–31 can be replaced by a single volute spring in each housing 21 and still achieve the desired effects and advantages of the invention. However, the use of two or more volute springs in each housing 21 enables a smaller, less expensive volute spring to be utilized and reduces the overall size of the spring assembly 20. Likewise, only a single spring assembly 20 may be used to achieve the desired tensioning force, instead of the double offset spring assembly arrangement shown in the drawings and described above. Again, the particular double spring assembly arrangement, each containing a pair of volute springs, is believed to provide a less expensive, reliable and more compact unit than a larger single volute spring.

It is easily understood from the above description and drawings that the improved volute spring-actuated belt tensioner can be incorporated into a belt tensioning arrangement of the type wherein one of the vehicle accessories is mounted on the extended end 37 of pivotally movable lever 35 for tensioning the drive belt which would be operatively engaged with the accessory pulley, replacing the idler pulley 40, shown in the preferred embodiment described above.

Accordingly, the improved belt tensioner construction provides an effective, safe and efficient device which can be formed relatively inexpensively of stamped sheet metal components, which has a unique damping ability provided by a plurality of volute springs which also provide the main power source for maintaining a nearly constant, predetermined tensioning force on the drive belt; and which provides a device which eliminates difficulties encountered with prior tensioning devices and arrangements and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved belt tensioner construction is constructed and used, the characteristics of the construction, and the advantageous, new and useful results obtained; the new and useful structures, devices, elements, arrangements, parts, and combinations, are set forth in the appended claims.

I claim:

1. A belt tensioner construction for tensioning an endless drive belt of a drive system for vehicle accessories, said tensioner construction including:
   (a) bracket means adapted to be mounted on a vehicle engine adjacent the drive belt;
   (b) lever means pivotally mounted on the bracket means and movable in a belt tensioning direction;
   (c) spring means mounted on the bracket means and operatively engageable with the lever means biasing the lever means in a belt tensioning direction, said spring means including two pairs of volute springs, each pair being mounted on an opposite end of the bracket means and operatively engageable with the lever means, with said lever means being pivotally mounted on the bracket means intermediate of the spring pairs; and (d) rotatable pulley means mounted on the lever means and movable toward tensioning engagement with the drive belt upon pivotal movement of the lever means by the spring means.

2. The tensioner construction defined in claim 1 in which each of the volute spring pairs is mounted within a cup-shaped housing; and in which a spacer disc is located within each housing between each volute spring of a pair.

3. The tensioner construction defined in claim 2 in which a pair of plungers is pivotally mounted on the lever means and in which each of the plungers extends toward and is operatively engageable with one of the volute springs for each of the spring pairs; and in which the imaginary axes of the plungers are generally parallel to each other and spaced apart with the pivotal mounting of the lever means being located between the imaginary axes of said plungers.

4. The tensioner construction defined in claim 3 in which the lever means has an elongated configuration; and in which the imaginary axis of the lever means extends generally perpendicular to the imaginary axes of the plungers.

5. A belt tensioner construction for tensioning an endless drive belt of a drive system for vehicle accessories, said tensioner construction including:
(a) a bracket adapted to be mounted on a vehicle engine adjacent the drive belt;
(b) a lever pivotally mounted on the bracket and movable in a belt tensioning direction;
(c) first and second housings mounted on the bracket in a spaced relationship, with the lever being pivotally mounted on the bracket intermediate said housings;
(d) volute spring means mounted within each of the housings and operatively engaged with the lever, pivotally biasing the lever in the belt tensioning direction; and
(e) a pulley mounted on the lever and movable into tensioning engagement with the drive belt upon pivotal movement of the lever by the volute spring means.

6. The tensioner construction defined in claim 5 in which the volute spring means includes a pair of volute springs mounted within the first housing and operatively engaged with the lever for biasing the lever in the belt tensioning direction.

7. The tensioner construction defined in claim 5 in which a plunger extends between and is operatively engaged with the lever and volute spring means to transmit the biasing force of the volute spring means to the lever.

8. The tensioner construction defined in claim 5 in which the pivotal mounting of the lever on the bracket is intermediate the location where the volute spring means are operatively engaged with the lever.

9. A belt tensioner construction for tensioning an endless drive belt of a drive system for vehicle accessories, said tensioner construction including:
(a) bracket means adapted to be mounted on a vehicle engine adjacent the drive belt, said bracket means having a generally Z-shaped configuration terminating in a pair of end flanges;
(b) lever means pivotally mounted on the bracket means intermediate the end flanges, and movable in a belt tensioning direction;
(c) a pair of volute springs mounted on the bracket means and operatively engageable with the lever means biasing the lever means in a belt tensioning direction, each of said springs being mounted on a respective one of the bracket flanges;
(d) a pair of plungers operatively engaged with and extending between a respective one of the volute springs and the lever means, with imaginary axes of the plungers being parallel to each other and perpendicular to an imaginary longitudinal axis of the lever means, and with the pivotal mounting of the lever means being located between the imaginary axes of the plungers; and
(e) rotatable pulley means mounted on the lever means and movable toward tensioning engagement with the drive belt upon pivotal movement of the lever means by the spring means.

10. A belt tensioner construction for tensioning an endless drive belt of a drive system for vehicle accessories, said tensioner construction including:
(a) bracket means adapted to be mounted on a vehicle engine adjacent the drive belt;
(b) lever means pivotally mounted on the bracket means and movable in a belt tensioning direction;
(c) spring means mounted on the bracket means and operatively engageable with the lever means biasing the lever means in a belt tensioning direction, said spring means including a pair of volute springs, each of said springs being mounted on an opposite end of the bracket means and operatively engageable with the lever means;
(d) a pair of plungers, each plunger extending between and operatively engaged with a respective one of the volute springs and the lever means to transmit the biasing force of the volute springs to the lever means, said pivotal mounting of the lever means being intermediate the locations where each of the plungers is engaged with the lever means; and
(e) rotatable pulley means mounted on the lever means and movable toward tensioning engagement with the drive belt upon pivotal movement of the lever means by the spring means.

* * * * *